E. BAILEY.
WIRELESS CORN PLANTER.
APPLICATION FILED SEPT. 15, 1917.
1,301,214.
Patented Apr. 22, 1919.
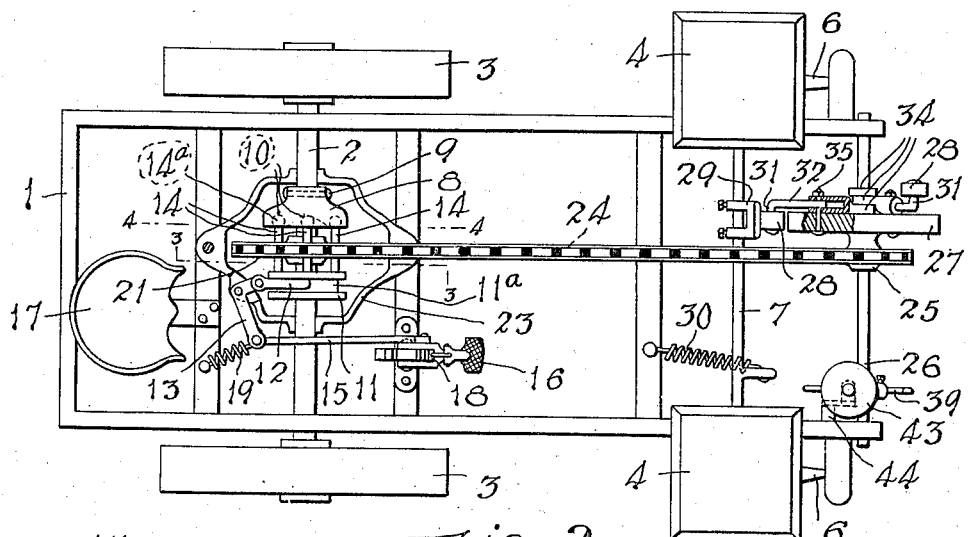
*Fig. 1.*
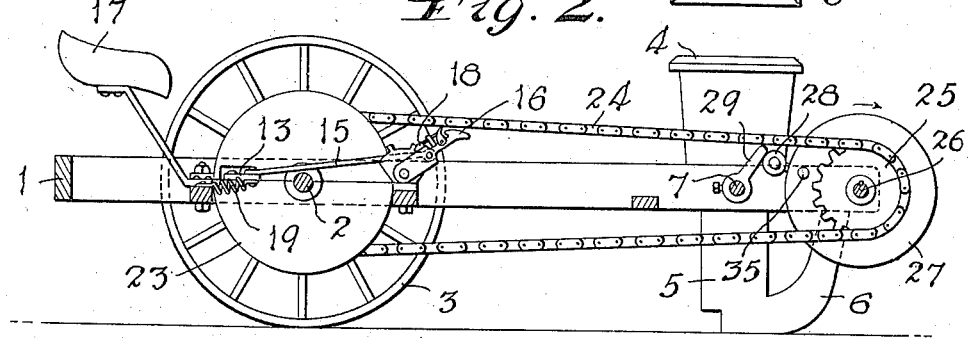
*Fig. 2.*
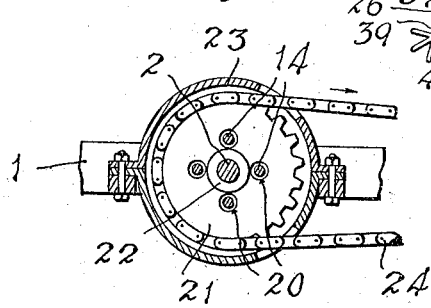
*Fig. 3.*
*Fig. 6.*
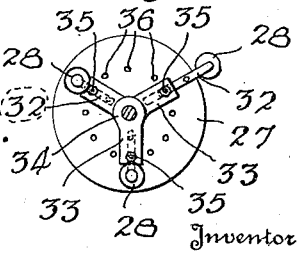
*Fig. 5.*
*Fig. 4.*
Inventor
EFFEL BAILEY
By
N. S. Hie
Attorney

UNITED STATES PATENT OFFICE.

EFFEL BAILEY, OF JENKINS, MISSOURI.

WIRELESS CORN-PLANTER.

1,301,214.   Specification of Letters Patent.   Patented Apr. 22, 1919.

Application filed September 15, 1917. Serial No. 191,552.

*To all whom it may concern:*

Be it known that I, EFFEL BAILEY, a citizen of the United States, residing at Jenkins, in the county of Barry, State of Missouri, have invented a new and useful Wireless Corn-Planter; and I do hereby declare the following to be a full, clear, and exact description of the invention, such as will enable others skilled in the art to which it appertains to make and use the same.

The present invention relates to a corn planter, and has for its object to provide a device of this character which embodies novel features of construction whereby the necessity of using a wire is eliminated and the dropping mechanism is actuated at proper intervals by a trip device to drop the corn at desired intervals.

Further objects of the invention are to provide a wireless corn planter which is comparatively simple and inexpensive in its construction, which is thoroughly dependable in its operation, which can be thrown into and out of gear while the corn planter is in motion, and which can be adjusted to deposit the seed corn at small or large intervals, as may be desired.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a wireless corn planter constructed in accordance with the invention, portions being broken away and shown in section to illustrate more clearly the details of construction.

Fig. 2 is a longitudinal sectional view through the corn planter.

Fig. 3 is a vertical sectional view on the line 3—3 of Fig. 1.

Fig. 4 is a similar view on the line 4—4 of Fig. 1, the housing for the clutch member being removed.

Fig. 5 is a detail view of the disk and trip rollers which are utilized to actuate the rock shaft of the seed dropping mechanism.

Fig. 6 is a detail view of the alarm mechanism.

Corresponding and like parts are referred to in the following description and indicated in all the views of the drawings by the same reference characters.

Referring to the drawings, which illustrate one embodiment of the invention, the numeral 1 designates a horizontal supporting frame which has a transversely extending axle 2 journaled thereon toward one end, said axle being provided with the supporting wheels 3 which are rigidly applied to the extremities thereof. The opposite end of the main frame is provided at the sides thereof with conventional hoppers 4, boots 5, and furrow openers 6, conventional dropping mechanism being arranged within each hopper at the base thereof and operatively connected to a transverse rock shaft 7.

The axle 2 is provided at an intermediate point in the length thereof with a clutch member 8 which is rigidly secured to the axle by a suitable fastening member such as the pin 9, and which is provided in the face thereof with a series of recesses 10, said recesses being elongated and arranged in the form of arcs of a circle, and having inclined bases so that they gradually become deeper from one end to the opposite end. A complemental clutch member 11 is slidably and rotatably mounted upon the axle 2 and has an opposed relation to the recessed face of the fixed clutch member 8. This complemental clutch member 11 has the periphery thereof grooved at 11$^a$ for engagement with the fork 12 of a bell crank shifting lever 13, and is provided with a series of arms 14 which extend in a parallel relation to the axle 2 and terminate in knobs 14$^a$ adapted to be moved into and out of engagement with the recesses 10 of the clutch member 8.

The bell crank shifting lever 13 is connected by a link 15 to a foot lever 16 which is arranged in a convenient position in front of the seat 17, and is provided with a conventional latch device 18 for locking the lever in either an operative or an inoperative position. A spring 19 engages the outer end of the bell crank shifting lever 13 and normally tends to pull it rearwardly to move the sliding clutch member 11 into inoperative position, although by pushing forwardly upon the foot lever 16 the shifting lever 13 can be moved against the action of the spring 19 to close the clutch and lock the clutch member 11 upon the axle 2 so that it will rotate therewith. The arms 14 of the sliding clutch member 11 pass loosely through openings 20 in a sprocket wheel 21 which is loose upon the axle between the two clutch members, being held against lateral movement upon the axle by collars 22 thereon. When the clutch is closed and the ends of the arms 14 are in engagement with the recesses 10 of the fixed clutch member 8 the sprocket wheel 21 will rotate with the axle 2 when the planter is advanced in a forward direction. However, should the planter be moved rearwardly the inclined bases of the recesses 10 would force the knobs 14ª at the ends of the arms 14 out of the said recesses so that the axle would rotate independently of the sprocket wheel. The clutch mechanism and sprocket are inclosed in a suitable housing 23 which serves to shield the same from injury and to exclude dust and dirt therefrom.

A drive chain 24 extends around the sprocket wheel 21 and also around a second sprocket wheel 25 upon a transverse shaft 26 which is journaled upon the forward end of the main frame and arranged in a spaced and parallel relation to the rock shaft 7. A disk 27 is rigid with the transverse shaft 26 and provided with trip rollers 28 which are mounted in a novel manner so that they can either be retracted into an inoperative position, or projected into operative position for engagement with a trip arm 29 which projects laterally from the rock shaft 7. When this trip arm 29 is engaged by a trip roller 28 the rock shaft 7 will be rotated against the action of a spring 30 a sufficient amount to operate the conventional seed droppers of the hoppers 4. As soon as the trip roller has moved beyond the trip arm 29 the rock shaft 7 will be returned to its original position by the action of the spring 30. These rollers 28 may be mounted in any suitable manner, being shown as journaled upon lateral arms 31 at the outer ends of rods 32 which have a telescoping engagement with tubular arms 33 carried by plates 34 which are loose upon the shaft 26 at one side of the disk 27. The rods 32 are rotatable within the tubular arms 33 to permit of the lateral arms 31 upon which the rollers 28 are journaled being turned toward or away from the disk. When the rods 32 are projected into operative position they are rotated to swing the trip rollers 28 over the periphery of the disk 27 in proper position for engagement with the trip arm 29 of the rock shaft as the disk is rotated. However, preparatory to retracting the trip rollers 28 into inoperative position the shafts 31 are rotated to swing the rollers away from the disk. Suitable fastening members, such as the bolts 35, pass through corresponding openings in the rods 32 and tubular arms 33 to lock the rods in either a projected or retracted position, and also engage selected ones of a series of openings 36 in the disk 27 to hold the trip rollers in desired angular relations at the periphery of the disk. When only one of the trip rollers 28 is used, it can be locked in position at any point upon the disk, while when two of the trip rollers are projected into operative position they would ordinarily be set at diametrically opposite points upon the disk. In a similar manner should all three of the trip rollers be employed they would be locked in position with equal angles between them. It will thus be apparent that by setting one or more of the trip rollers in operative position adjustment can be made to drop the seed corn at those intervals which it is thought will give the best results.

It is contemplated to provide an alarm mechanism which will sound each time a hill of corn is planted, thereby enabling the operator to open the clutch at exactly the proper time when the end of a row is reached. A hub member 37 is applied to the shaft 26, said hub member being provided with tubular arms 38 within which trip arms 39 are slidably mounted. These trip arms are adapted to be locked in either a projected or retracted position by means of set screws 40. The outer ends of the trip arms are preferably forked, as indicated at 39ª, and when a trip arm is set in a projected position the forked end thereof will engage the roller 41 of a tappet member 42 and cause the latter to strike a bell 43, said bell being suitably mounted upon a bracket 44. With this arrangement the operator will have no difficulty in opening the clutch to throw the planting mechanism out of operation at exactly the right time when the end of a row is reached.

Having thus described the invention, what I claim as new and desire to secure by Letters Patent, is:—

1. In a device of the character described, the combination with a rock shaft formed with a trip arm, of a drive shaft arranged in spaced and parallel relation to the rock shaft, a disk on the drive shaft, a series of radial rods mounted on the disk, trip rollers carried by the rods and means for locking the rods in various angular relations and in either a retracted or projected position, the trip rollers serving to engage the trip arm when locked in a projected position.

2. In a device of the character described, the combination with a rock shaft formed with a trip arm, of a drive shaft arranged in a spaced and parallel relation to the rock shaft, a disk on the drive shaft, a plate loose upon the shaft at one side of the disk, telescoping members carried by the plate and projecting radially at the side of the disk, a trip roller at the outer end of the telescoping members, and means for locking the telescoping members of the disk with the roller either retracted into inoperative position or projected into position for engagement with the trip arm of the rock shaft.

3. In a device of the character described, the combination with a rock shaft formed with a trip arm, of a drive shaft arranged in a spaced and parallel relation to the rock shaft, a disk on the drive shaft, a plate loose on the shaft at one side of the disk, telescoping members carried by the plate and extending radially at the side of the disk, the outer telescoping member terminating in a lateral arm adapted to be turned either toward or away from the disk, and means for securing the telescoping members to the disk with the lateral arm turned away therefrom and retracted into inoperative position or projected outwardly and turned over the periphery of the disk for engagement with the trip arm of the rock shaft.

In testimony whereof I have signed my name to this specification in the presence of two subscribing witnesses.

EFFEL BAILEY.

Witnesses:
 E. M. HENSON,
 G. R. BOLIN.

Copies of this patent may be obtained for five cents each, by addressing the "Commissioner of Patents, Washington, D. C."